(12) United States Patent
Ikeda

(10) Patent No.: US 8,591,303 B2
(45) Date of Patent: Nov. 26, 2013

(54) DEVICE FOR PROVIDING A GAME

(71) Applicant: DeNA Co., Ltd., Tokyo (JP)

(72) Inventor: Ryuji Ikeda, Tokyo (JP)

(73) Assignee: DeNA Co., Ltd., Tokyo (JP)

( * ) Notice: Subject to any disclaimer, the term of this patent is extended or adjusted under 35 U.S.C. 154(b) by 0 days.

(21) Appl. No.: 13/775,007

(22) Filed: Feb. 22, 2013

(65) Prior Publication Data

US 2013/0225286 A1 Aug. 29, 2013

(30) Foreign Application Priority Data

Feb. 28, 2012 (JP) ................................ 20102-041908

(51) Int. Cl.
*A63F 9/24* (2006.01)
(52) U.S. Cl.
USPC .............................................................. 463/1
(58) Field of Classification Search
USPC ............................................................. 462/1
See application file for complete search history.

(56) References Cited

U.S. PATENT DOCUMENTS

| | | | | |
|---|---|---|---|---|
| 4,926,327 | A * | 5/1990 | Sidley .............................. | 463/13 |
| 6,398,651 | B1 * | 6/2002 | Yamada ........................... | 463/43 |
| 2007/0202952 | A1 * | 8/2007 | Francis et al. .................. | 463/42 |

FOREIGN PATENT DOCUMENTS

| | | |
|---|---|---|
| JP | 2003-225461 | 8/2003 |
| JP | 2009-050387 | 3/2009 |

OTHER PUBLICATIONS

Japanese Office Action of Japanese Patent Application No. 2012-041908, dated Jul. 4, 2012 and English translation, thereof.

Studio BentStuff, Co., Ltd., Se-Mook Kingdom Hearts II, Final Mix+Ultimania, $4^{th}$ Print, Square ENIX, Co., Ltd., Feb. 20, 2008, pp. 248-267 (particularly pp. 257 and 265) (cited reference of Japanese Office Action of Japanese Patent Application No. 2012-041908, dated Jul. 4, 2012.
Japanese Office Action of Japanese Patent Application No. 2012-226426, dated Nov. 6, 2012 and English translation thereof.
Se-Mook Kingdom Hearts II, Final Mix+Ultimania, $4^{th}$ Print, Square Enix, Co., Ltd., Feb. 20, 2008, pp. 248-267 and 358 (cited reference of Japanese Office Action of Japanese Patent Application No. 2012-226426).
Official Guidebook of Wonder Life Special: Doraemon, Great Adventure of Nobita in a New Demon World DS, $1^{st}$ Edition, $1^{st}$ Print, Shogakukan, Inc., Apr. 12, 2007, p. 13 (cited reference of Japanese Office Action of Japanese Patent Application No. 2012-226426).
"Granduel," Dengeki Nintendo 64, Media Works, Inc., Nov. 1, 1999, vol. 4, No. 11, p. 111 (cited reference of Japanese Office Action of Japanese Patent Application No. 2012-226426).

* cited by examiner

*Primary Examiner* — Corbett B Coburn
(74) *Attorney, Agent, or Firm* — Pillsbury Winthrop Shaw Pittman LLP

(57) ABSTRACT

One object is to provide a device for efficiently displaying cards possessed by a user. In accordance with one aspect, a server device for providing a game according to one embodiment includes an identification unit for identifying, as one card group, a plurality of specific cards satisfying a specific criterion among a plurality of cards, and a control unit for generating a display image including the first information identifying one card group and the second information identifying the number of a plurality of specific cards constituting the one card group. The display image is transmitted to a terminal device.

7 Claims, 12 Drawing Sheets

| Card ID | C1 | C2 | C3 | C4 | C5 | C6 | C7 | C8 | C9 |
|---|---|---|---|---|---|---|---|---|---|
| Card | | | | | | | | | |
| Type | Soldier A | Soldier A | Soldier A | Soldier B | Soldier B | Soldier B | Soldier C | Soldier C | Soldier D |
| Level | 4 | 5 | 6 | 4 | 5 | 6 | 4 | 5 | 8 |
| Offensive Power | 5 | 6 | 7 | 6 | 7 | 8 | 7 | 8 | 5 |

FIG. 4

| Criterion 1 | Having Same Content for a Parameter "Type" | | | | | | | | |
|---|---|---|---|---|---|---|---|---|---|
| Group ID | G10 | | | G11 | | | G12 | | G13 |
| Card ID | C1 | C2 | C3 | C4 | C5 | C6 | C7 | C8 | C9 |
| Card | | | | | | | | | |
| Type | Soldier A | Soldier A | Soldier A | Soldier B | Soldier B | Soldier B | Soldier C | Soldier C | Soldier D |
| Level | 4 | 5 | 6 | 4 | 5 | 6 | 4 | 5 | 8 |
| Offensive Power | 5 | 6 | 7 | 6 | 7 | 8 | 7 | 8 | 5 |
| Display Style 1 | | | | | | | | | |
| Display Style 2 | | | | | | | | | |

FIG. 5

| Criterion 2 | Having Same Content for Patameter "Level" | | | | | | | | |
|---|---|---|---|---|---|---|---|---|---|
| Group ID | G20 | | | G21 | | | G22 | | G23 |
| Card ID | C1 | C4 | C7 | C2 | C5 | C8 | C3 | C6 | C9 |
| Card | | | | | | | | | |
| Type | Soldier A | Soldier B | Soldier C | Soldier A | Soldier B | Soldier C | Soldier A | Soldier B | Soldier D |
| Level | 4 | 4 | 4 | 5 | 5 | 5 | 6 | 6 | 8 |
| Offensive Power | 5 | 6 | 7 | 6 | 7 | 8 | 7 | 8 | 5 |
| Display Style 1 | | | | | | | | | |
| Display Style 2 | | | | | | | | | |

FIG. 6

DEVICE FOR PROVIDING A GAME

CROSS-REFERENCE TO RELATED APPLICATIONS

This application is based on and claims the benefit of priority from Japanese Patent Application Serial No. 2012-041908 (filed on Feb. 28, 2012), the contents of which are hereby incorporated by reference in its entirety.

TECHNICAL FIELD

The present invention relates to a device for providing a game.

BACKGROUND

In recent years, "card games" are becoming popular, which are played on mobile phones, personal computers, and game consoles. In a card game, a user can collect cards carrying a character and exchange such cards with other users; and further the user can match the own possessed cards with cards of other users or characters appearing on a game.

Each of the cards has parameters (e.g., "attribute," "level," "offensive power," and "defensive power") required to be set for the progression of a game. These parameters are updated in the progression of the game, and the game further progresses based on the updated parameters.

A method for managing cards possessed by users in a card game is disclosed in Japanese Patent Application Laid-open No. 2009-50387. In this method, cards possessed by a user are arranged on a display, and a user selects a desired card from the arranged cards using a mouse.

SUMMARY

However, in the above method of the related art, a user possessing an increased number of cards is required to check each of the numerous cards displayed to select a desired card, with much time and effort. This problem is significant particularly in playing a card game on a mobile phone having a small display area or a small device such as a mobile game console. To overcome this problem, the embodiments of the present invention provide devices that efficiently display cards possessed by a user.

A server device according to one embodiment of the present invention provides a game to a terminal device operated by a player and connected to the server device via a communication network, the server device comprising: an information storage unit for storing information on at least a plurality of game media; a first identification unit for reading the information on the plurality of game media from the information storage unit and identifying, among the plurality of game media, a plurality of specific game media satisfying a specific criterion as one game medium group; a second identification unit for identifying a number of the plurality of specific game media constituting the one game medium group; and a control unit for generating and displaying on a display unit of the terminal device a display image including first information identifying the one game medium group and second information identifying the number of the plurality of specific game media, wherein the control unit transitions from a first display mode, where each of the plurality of game media is arranged in one unit display area in the display image, to a second display mode, where the first information and the second information are arranged in one unit display area in the display image.

A game system according to one embodiment of the present invention has a terminal device operated by a player and a server device connected to the terminal device via a communication network, for providing a game to the terminal device, the game system comprising: an information storage unit for storing information on at least a plurality of game media; a first identification unit for reading the information on the plurality of game media from the information storage unit and identifying, among the plurality of game media, a plurality of specific game media satisfying a specific criterion as one game medium group; a second identification unit for identifying a number of the plurality of specific game media constituting the one game medium group; and a control unit for generating and displaying on a display unit of the terminal device a display image including first information identifying the one game medium group and second information identifying the number of the plurality of specific game media, wherein the control unit transitions from a first display mode, where each of the plurality of game media is arranged in one unit display area in the display image, to a second display mode, where the first information and the second information are arranged in one unit display area in the display image A game program according to one embodiment of the present invention causes a computer connected to a terminal device operated by a player via a communication network and capable of accessing an information storage unit for storing information on at least a plurality of game media, to function as: a unit for reading the information on the plurality of game media from the information storage unit and identifying, among the plurality of game media, a plurality of specific game media satisfying a specific criterion as one game medium group; a unit for identifying a number of the plurality of specific game media constituting the one game medium group; a unit for generating and displaying on a display unit of the terminal device a display image including first information identifying the one game medium group and second information identifying the number of the plurality of specific game media, and a unit for transitioning from a first display mode, where each of the plurality of game media is arranged in one unit display area in the display image, to a second display mode, where the first information and the second information are arranged in one unit display area in the display image.

The embodiments of the present invention provide games wherein game media possessed by a user are efficiently displayed.

BRIEF DESCRIPTION OF THE DRAWINGS

FIG. 4 is a table showing specific examples of cards stored on a game program storage unit 51 of the server device 10 according to Embodiment 1 of the present invention.

FIG. 5 is a table showing specific examples of card groups identified by a card identification unit 52 of the server device 10 according to Embodiment 1 of the present invention.

FIG. 6 is a table showing other specific examples of card groups identified by the card identification unit 52 of the server device 10 according to Embodiment 1 of the present invention.

DESCRIPTION OF EXAMPLE EMBODIMENTS

Figure 1:
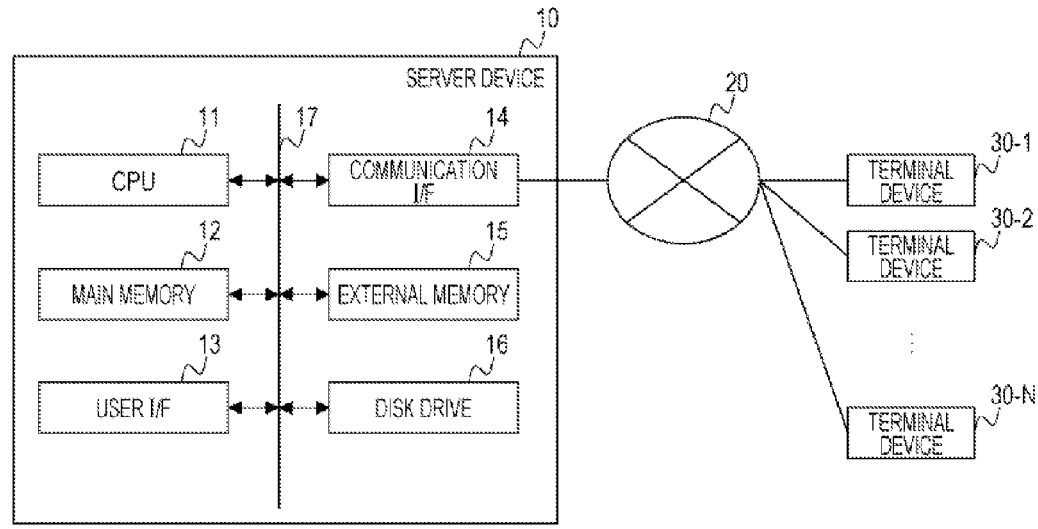
FIG. 1 is a block diagram schematically illustrating the architecture of a game system according to Embodiment 1 of the present invention.

Some embodiments of the present invention will be described hereinafter with reference to the drawings. In the drawings, the same components are denoted by the same reference numerals.

Embodiment 1

For this embodiment, a card game provided as an online game is described as an example of games utilizing game media. Available game media include figures and avatars in addition to cards; and the contents displayed as game media include characters, weapons, items, spells, and any other types possessed and managed by a player for progress of a game. FIG. 1 is a block diagram schematically illustrating the architecture of a game system according to Embodiment 1 of the present invention. As illustrated in FIG. 1, in an embodiment of the present disclosure, an online game server device 10 (hereinafter also referred to simply as the "server device 10") is communicatively connected to a plurality of terminal devices 30-1, 30-2, . . . , and 30-N (hereinafter also collectively referred to as the "terminal devices 30"), each having a communication function, via a communication network 20 such as the Internet.

As illustrated in FIG. 1, the server device 10 includes a central processing unit (CPU) 11, a main memory 12, a user interface (I/F) 13, a communication I/F 14, an external memory 15, and a disk drive 16, and these components are electrically connected to one another via a bus 17. The CPU 11 loads an operating system and various programs for controlling the progress of an online game into the main memory 12 from the external memory 15, and executes commands included in the loaded programs. The main memory 12 is used to store a program to be executed by the CPU 11, and is formed of, for example, a dynamic random access memory (DRAM).

The user I/F 13 includes, for example, an information input device such as a keyboard or a mouse for accepting an input from an operator, and an information output device such as a liquid crystal display for outputting calculation results of the CPU 11. The communication I/F 14 is implemented as hardware, firmware, or communication software such as a transmission control protocol/Internet protocol (TCP/IP) driver or a point-to-point protocol (PPP) driver, or a combination thereof, and is configured to be able to communicate with the terminal devices 30 via the communication network 20.

The external memory 15 is formed of, for example, a magnetic disk drive, and stores various programs such as a game program for allowing the terminal device 30 to execute an online game and a control program for controlling the progress of the online game. The game program is created using, for example, Adobe Flash™, which is a format developed by Adobe Systems Incorporated to handle moving images, games, and the like. The game program created using Adobe Flash™ is stored in the external memory 15 as a small web format (SWF) file. The game program will be described below. The disk drive 16 reads data stored in a storage medium such as a compact disc read only memory (CD-ROM), digital versatile disc read only memory (DVD-ROM), or DVD Recordable (DVD-R) disc, or writes data to such a storage medium. For example, data of a game program or the like stored in a storage medium is read by the disk drive 16, and is installed into the external memory 15.

Figure 2:
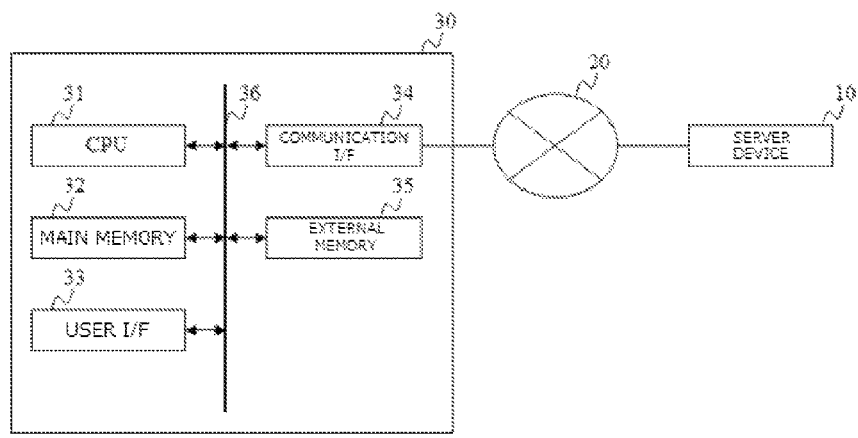
FIG. 2 is a block diagram schematically illustrating the architecture of a terminal device 30 according to Embodiment 1 of the present invention.

The terminal device 30 may be any information processing device capable of executing and operating a game program stored on the server device 10, such as a mobile phone, a smartphone, a game console, a personal computer, a tablet, or an electronic book reader, and displayed on a web browser. Additionally, the terminal device 30 is capable of receiving a game program from the server device 10 through a communication I/F 34 (described later) for executing the game. The architecture common to these various terminal devices 30 will be described with reference to FIG. 2. FIG. 2 is a block diagram schematically illustrating the architecture of a terminal device 30 according to Embodiment 1 of the present invention. As illustrated in FIG. 2, the terminal device 30 includes a central processing unit (CPU) 31, a main memory 32, a user interface (I/F) 33, a communication I/F 34, and an external memory 35, and these components are electrically connected to one another via a bus 36.

The CPU 31 loads various programs such as an operating system into the main memory 32 from the external memory 35, and executes commands included in the loaded programs. The main memory 32 stores a program to be executed by the CPU 31, and is formed of, for example, a dynamic random access memory (DRAM).

The user I/F 33 includes, for example, an information input device such as a touch panel, a keyboard, a button, and a mouse for accepting an input from a player (user), and an information output device such as a liquid crystal display for outputting calculation results of the CPU 31. The communication I/F 34 is implemented as hardware, firmware, or communication software such as a transmission control protocol/

Internet protocol (TCP/IP) driver or a point-to-point protocol (PPP) driver, or a combination thereof, and is configured to be able to communicate with the server device 10 via the communication network 20.

The external memory 35 comprises, for example, a magnetic disk drive or a flash memory and stores various programs such as an operating system. When receiving a game program from the server device 10 via the communication I/F 34, the external memory 35 stores the received game program.

The terminal device 30 having such architecture is provided with, for example, browser software for interpreting a hypertext markup language (HTML) file and displaying a screen, and plug-in software (e.g., Flash Player distributed by Adobe Systems Incorporated) incorporated in the browser software. The terminal device 30 acquires an SWF file embedded in an HTML file from the server device 10, and executes the SWF file using the browser software and plug-in software, and therefore the user of the terminal device 30, or a game player, may be provided with a gaming function.

A game program will be described with reference to FIGS. 1 and 2. The game program is stored on the external memory 15 of the server device 10 in various forms. For example, the game program may be provided as a piece of application software executable on various application execution platforms. The player is able to execute or operate a game application using the terminal device 30.

The external memory 15 of the server device 10 stores game programs for executing or operating various games executable or operable on the terminal device 30. The game programs may be created using, for example, script languages such as ActionScript™ and JavaScript™, or object-oriented programming languages such as Objective-C™ and Java™. The game programs are executed or operated on a platform installed on the terminal device 30. A game program to be stored on the external memory 15 may be produced by modifying a web page created in a markup language such as HTML5 by using a style sheet such as Cascading Style Sheet 3 (CSS3). Such a web page created in a markup language is executed or operated by the browser software installed on the terminal device 30. The external memory 15 of the server device 10 may store a desired number of game programs, and a game program for executing or operating a game selected by the terminal device 30 may be provided to a desired number of terminal devices 30 via the communication I/F 14 in accordance with control of the CPU 11. In the terminal device 30, the game program sent from the server device 10 is transferred to the external memory 35 via the communication I/F 34 in accordance with control of the CPU 31.

The terminal device 30 may execute or operate the game program to play various games such as action games, role-playing games, interactive baseball games, and card games. The games implemented by the game program are not limited to those explicitly disclosed herein. When a game is executed, for example, animation or an operation icon designated by the program is displayed on a screen of the terminal device 30. The player may enter an instruction for causing the game to progress using an input interface (e.g., a touch screen or a button) of the terminal device 30. The instruction entered by the player is transmitted to the server device 10 through the browser of the terminal device 30 or a platform function such as NgCore™. The terminal device 30 sends information indicating various parameters (such as the number of game points earned and information concerning obtained items) used in the game, and information indicating the status of the game (such as information specifying which mission has been fulfilled) to the server device 10, if necessary. The server device 10 manages the progress of the individual players in the game in accordance with information received from the plurality of terminal devices 30, such as instructions, information indicating the parameters, and information indicating the statuses. Thus, each player is able to resume the interrupted game from the point where it was interrupted, on the basis of the information concerning the progress of the game held in the server device 10.

Figure 3:
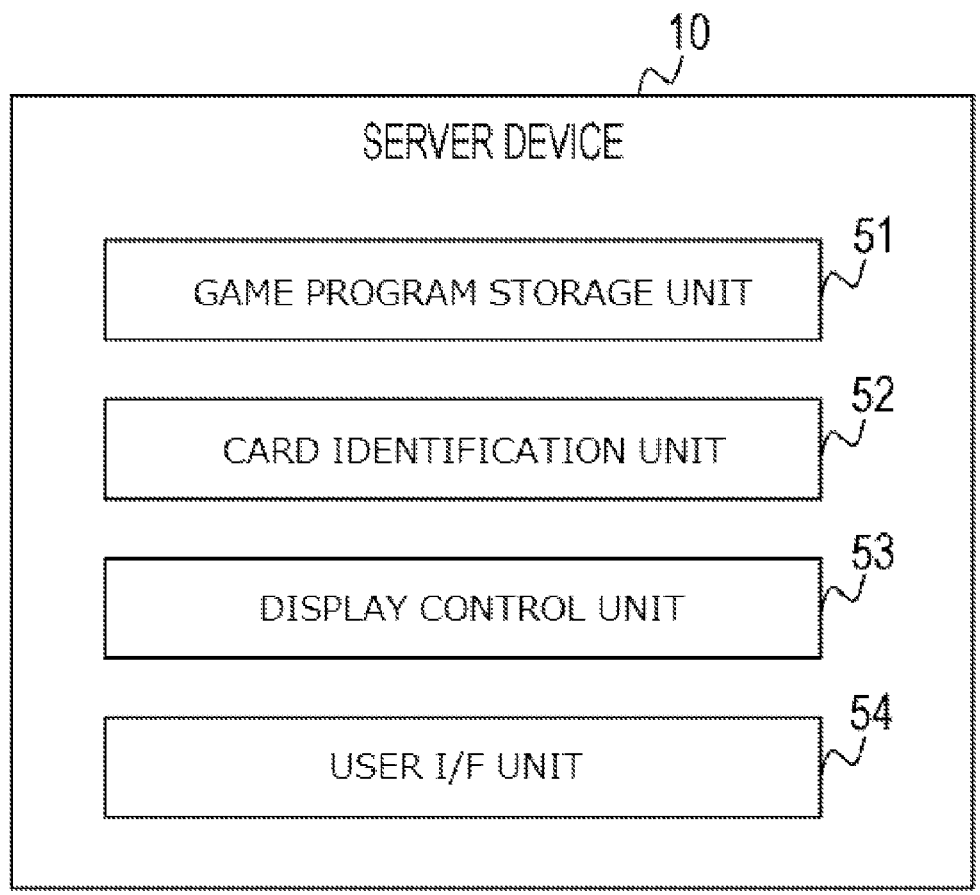
FIG. 3 is a block diagram illustrating the functions of a server device 10 according to Embodiment 1 of the present invention.

Next, the functionality of the server device 10 implemented by the components shown in FIG. 1 will be described with reference to FIG. 3. FIG. 3 is a block diagram illustrating the functionality of a server device 10 according to Embodiment 1 of the present invention. As shown in FIG. 3, the server device 10 according to this embodiment comprises a game program storage unit 51, card identification unit 52, a display control unit 53, and a user I/F unit 54. The game program storage unit 51 stores information on the cards obtained by users (players) of the terminal devices 30 in execution of a game program.

The card identification unit 52 receives information on a plurality of cards (game media) stored on the game program storage unit 51 and, among these cards, identifies a plurality of specific cards satisfying a specific criterion (specific game media) as one card group (a game medium group) (the first identification function). Further, the card identification unit 52 identifies the number of specific cards (specific game media) constituting thus identified one card group (a game medium group) (the second identification function). A specific example of the identification operation performed by the card identification unit 52 will be described with reference to FIGS. 4 to 6. FIG. 4 is a table showing specific examples of cards stored on a game program storage unit 51 of the server device 10 according to Embodiment 1 of the present invention. FIG. 5 is a table showing specific examples of card groups identified by a card identification unit 52 of the server device 10 according to Embodiment 1 of the present invention. FIG. 6 is a table showing other specific examples of card groups identified by the card identification unit 52 of the server device 10 according to Embodiment 1 of the present invention.

In FIG. 4, the game program storage unit 51 stores nine cards identified by card identification numbers C1 to C9, respectively. For example, when the specific criterion is Criterion 1 that requires the same content for the parameter "type," the cards C1, C2, and C3 (specific cards) whose "type" is "soldier A" are identified as one card group (having a group identification number of G10), as shown in FIG. 5. Further, the number of specific cards (C1, C2, and C3) constituting this card group (G10) is identified as three. Likewise, the cards C4, C5, and C6 (specific cards) whose "type" is "soldier B" are identified as one card group (having a group identification number of G11). The number of specific cards (C4, C5, and C6) constituting this card group (G11) is also identified as three.

For example, when the specific criterion is Criterion 2 that requires the same content for the parameter "level," the cards C1, C4, and C7 (specific cards) whose "level" is "level 4" are identified as one card group (having a group identification number of G20), as shown in FIG. 6. Further, the number of specific cards (C1, C4, and C7) constituting this card group (G20) is identified as three. Likewise, the cards C2, C5, and C8 (specific cards) whose "level" is "level 5" are identified as one card group (having a group identification number of G21). The number of specific cards (C2, C5, and C8) constituting this card group (G21) is also identified as three.

Referring back to FIG. 3, the card identification unit 52 sends, to the display control unit 53, information on the plurality of cards read from the game program storage unit 51 and information on the identified card groups. The display control unit 53 generates, from the information received from the card identification unit 52, a display image to be displayed on a display of a terminal device 30 of a player, based on the content of the operation by the player received from the user I/F unit 54.

More specifically, when receiving from the user I/F unit 54 information indicating that the player has selected "the first display mode," the display control unit 53 generates a display image wherein a plurality of cards possessed by the player are arranged as shown in FIG. 4.

In contrast, when receiving from the user I/F unit 54 information indicating that the player has selected "the second display mode," the display control unit 53 generates a display image, as shown in "Display Style 1" of FIG. 5, including the first information identifying one card group G10, that is, a character image 61 of "soldier A" identifying the card group G10 and the second information identifying the number of the cards constituting the card group G10, that is, the numeral 62 of "3" representing three cards. Alternatively, as shown in "Display Style 2" of FIG. 5, the display control unit 53 generates a display image including the first information identifying one card group G10, that is, a character image 61 of "soldier A" identifying the card group G10 and the second information identifying the number of the cards constituting the card group G10, that is, a pattern 63 including "three" overlaid character images 61.

For further example, as shown in "Display Style 1" of FIG. 6, the display control unit 53 generates a display image including the first information identifying one card group G20, that is, a character string 71 of "Lv4" (representing "Level 4") identifying the card group G20 and the second information identifying the number of the cards constituting the card group G20, that is, a numeral 72 of "3" representing three cards. Alternatively, as shown in "Display Style 2" of FIG. 6, the display control unit 53 generates a display image including a character string 71 of "Lv4" identifying the card group G20 and the second information identifying the number of the cards constituting the card group G20, that is, a pattern 73 including "three" overlaid character images. The display image thus generated by the display control unit 53 is sent to the terminal devices 30 of the players by the user I/F unit 54 and is displayed on the displays of the terminal devices 30.

Figure 7:
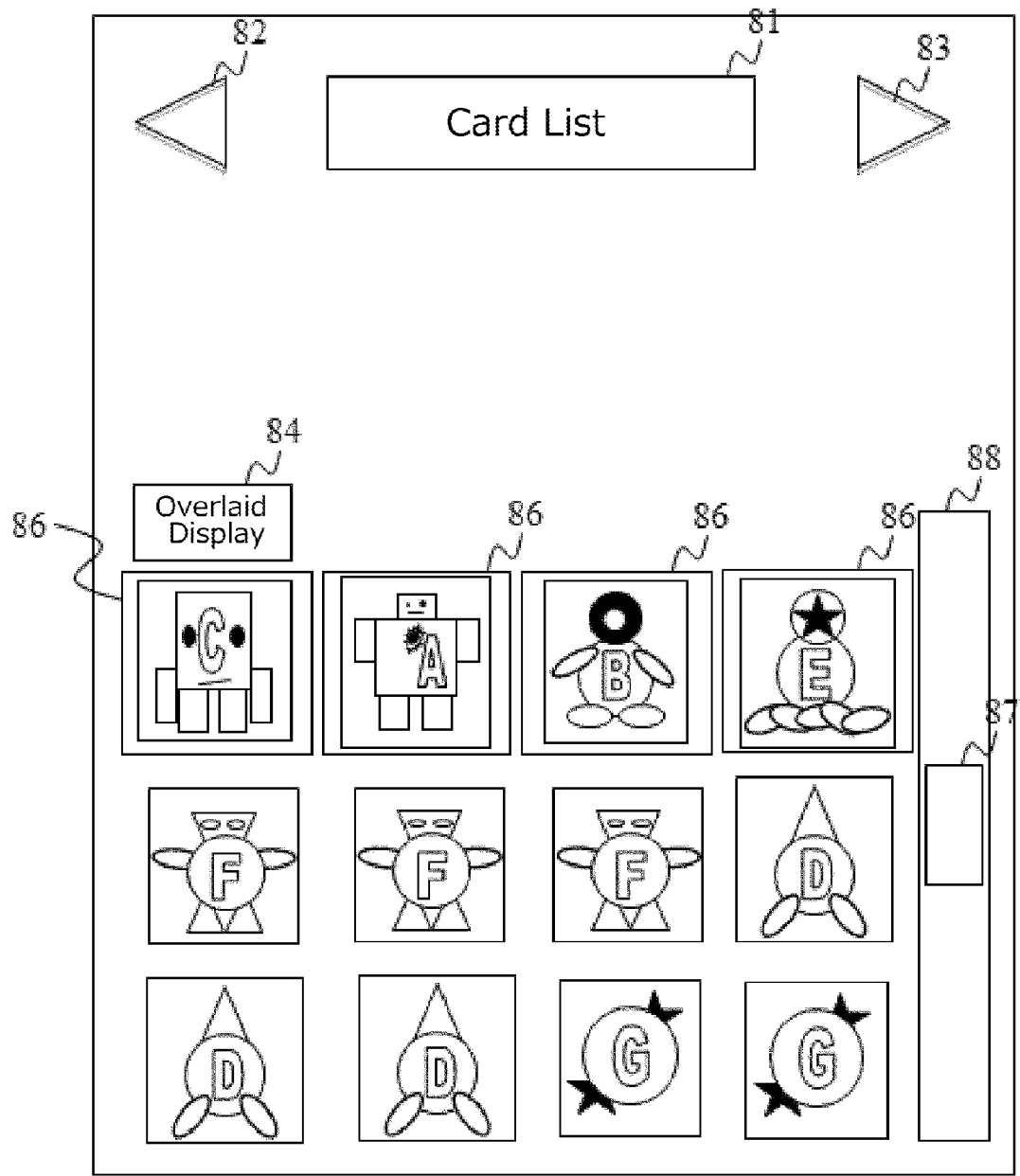
FIG. 7 is a schematic diagram illustrating a display in a first display mode on the terminal device 30 according to Embodiment 1 of the present invention.
Figure 8:
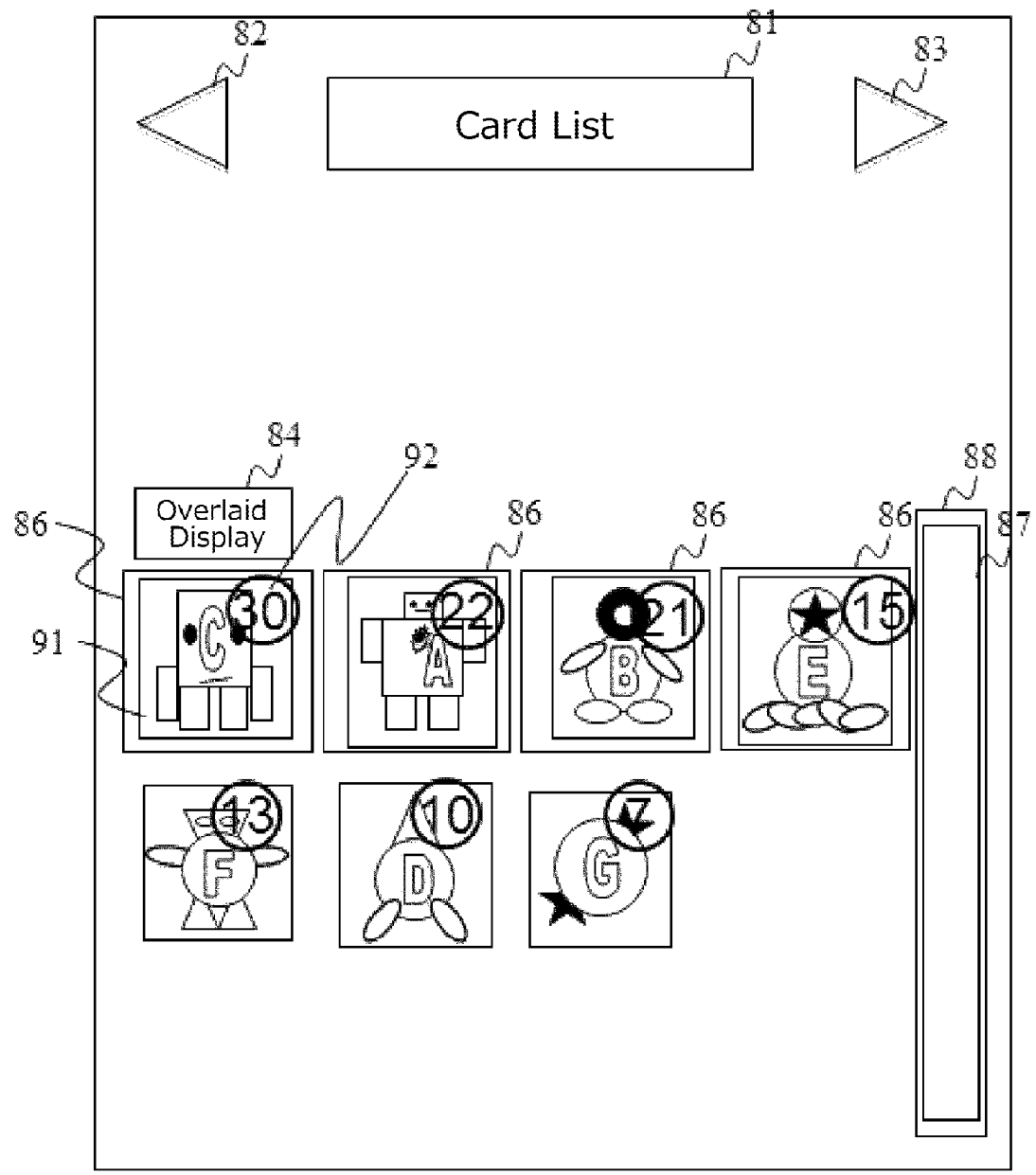
FIG. 8 is a schematic diagram illustrating a display in a second display mode on the terminal device 30 according to Embodiment 1 of the present invention.

Reference is now made to FIGS. 7 and 8 to describe how the display image generated by the display control unit 53 in accordance with "the first display mode" or "the second display mode" is displayed on the displays of the terminal devices 30. FIG. 7 is a schematic diagram illustrating a display in the first display mode on the terminal device 30 according to Embodiment 1 of the present invention. FIG. 8 is a schematic diagram illustrating a display in the second display mode on the terminal device 30 according to Embodiment 1 of the present invention.

Referring to FIG. 7, the screen contains in the top portion an indication 81 indicating that a menu showing a list of cards possessed by the player is selected. The player can select other menus by clicking or tapping a button 82 or a button 83. The screen contains, in the middle left portion, "Overlaid Display" button 84 for selecting the second display mode. Currently, the screen is in the first display mode because the button 84 is inactive. In the first display mode, a plurality of cards possessed by the player are arranged horizontally and vertically. Each of the plurality of cards is displayed in one unit display area 86. The screen contains, in the lower right portion, a scrollbar 87 operated to near the middle of its range 88, indicating that the player possesses more cards than can be arranged within the screen. To view the cards out of the screen, the player is required to operate the scrollbar 87 vertically. When the player clicks or taps the button 84, the second display mode becomes active (and if the player again clicks or taps the button 84, the first display mode becomes active).

FIG. 8 shows the screen in the second display mode wherein, for example, the top left unit display area 86 represents thirty cards of "soldier C." More specifically, the unit display area 86 shows, in an overlaying manner (or collectively), the first information identifying one card group, that is, a character image 91 of "soldier C" identifying one card group and the second information identifying the number of the cards constituting the card group, that is, the numeral 92 of "30" representing thirty cards. Thus, a plurality of cards possessed by a player are sorted into card groups, each allocated one unit display area showing the information for identifying the card group and the information identifying the number of the cards constituting the card group. Such a display reduces the total number of displayed cards which are possessed by the player, enabling the player to grasp the own possessed cards quickly and readily.

Embodiment 2

For this embodiment, a fusion (enhancing) function of cards will be described which uses the above display method of cards according to Embodiment 1. A "fusion (enhancing)" function varies the parameters set for cards in a card game, wherein a card as a base (hereinafter "base card") is fused with other cards (hereinafter "cards for fusion [feeder cards]") to vary the parameters set for the base card. The number of cards to be fused with a base card may be either one or larger. To perform the fusion (enhancing) function, the player selects, from the own possessed cards, one base card and then one or more cards for fusion (feeder cards). When the upper limit of the number of cards to be fused with a base card in the game is nine for example, the player selects nine cards for fusion (feeder cards) from the cards displayed in the card list screen (e.g., FIGS. 7 and 8).

Figure 9:
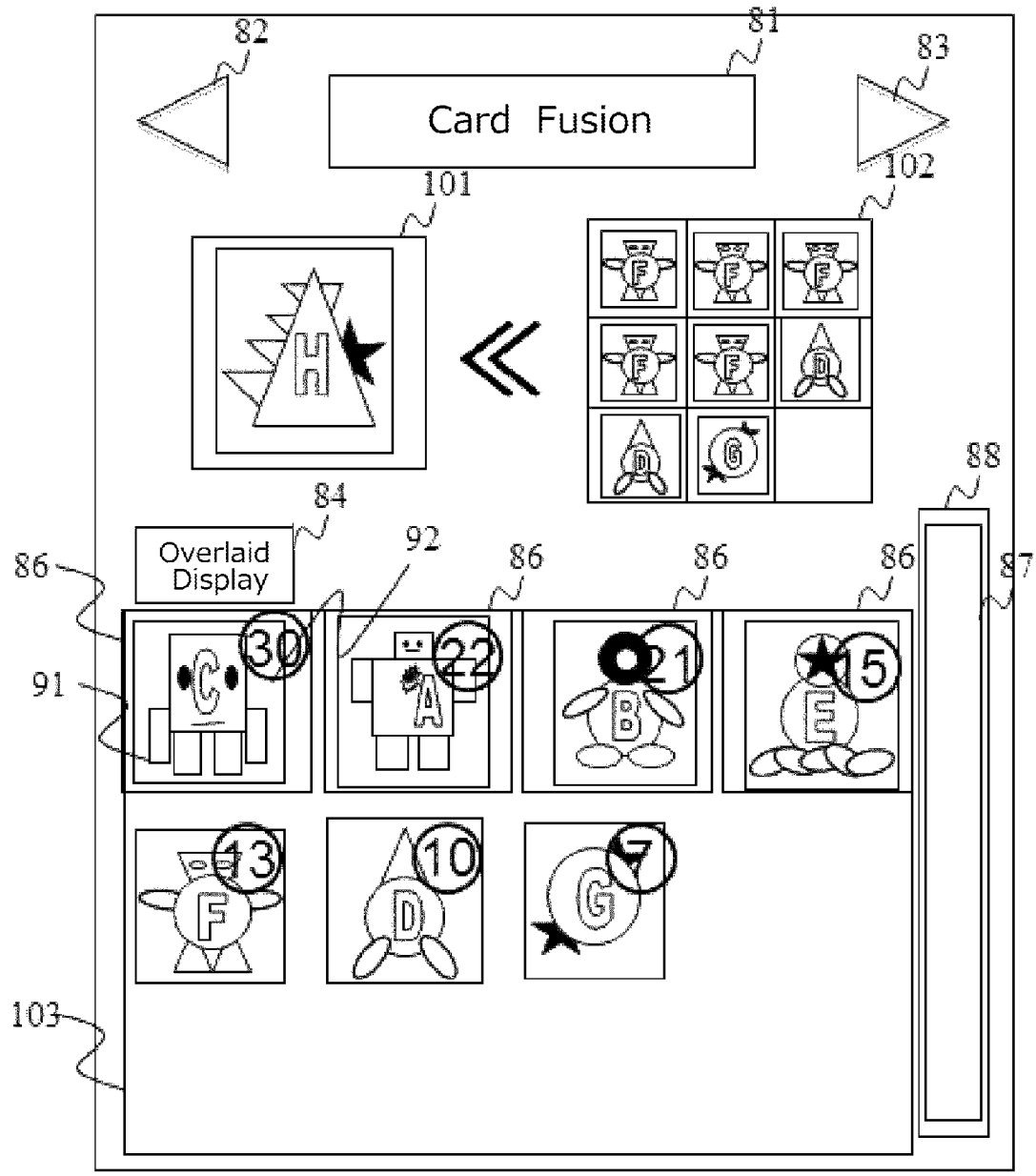
FIG. 9 is a schematic diagram illustrating a display on the terminal device shown when the server device performs a fusion (enhancing) function according to Embodiment 2 of the present invention.

FIG. 9 is a schematic diagram illustrating a display on a terminal device shown when a server device performs a fusion (enhancing) function according to Embodiment 2 of the present invention. As shown in FIG. 9, the screen contains, in the upper left portion, an area 101 for placing a base card and, to the right of the area 101, an area 102 for placing cards for fusion (feeder cards); the screen also contains, in the lower portion, an area 103 for placing the cards possessed by the player. In this screen, the second display mode is active.

First, the player selects a base card by tapping or clicking a card among the cards displayed in the area 103; and the base card is displayed in the area 101 as shown in FIG. 9. The base card disappears from the area 103.

Next, the player selects a card for fusion (feeder card) by tapping or clicking a card among the cards displayed in the area 103; and the card for fusion (feeder card) is displayed in the area 102. The selected card for fusion (feeder card) disappears from the area 103. The player repeats this operation to select up to nine cards for fusion (feeder cards) and then performs a confirmation operation; and the base card displayed in the area 101 is fused with the cards for fusion (feeder cards) which are displayed in the area 102. Thus, the parameters set for the base card are varied, and the cards for fusion (feeder cards) are deleted from the cards possessed by the player.

Thus, in this embodiment, a plurality of cards possessed by a player are sorted into card groups, each allocated one unit display area showing the information for identifying the card group and the information identifying the number of the cards constituting the card group. Such a display reduces the total number of displayed cards which are possessed by the player, enabling the player to grasp the own possessed cards quickly and readily. Accordingly, the player can quickly and readily select a base card and cards for fusion (feeder cards) from a large number of own possessed cards for processing; and thus the fusion of cards is quickly and readily performed.

Embodiment 3

For this embodiment, a method for efficiently selecting cards for fusion (feeder cards) in the second display mode will be described with reference to FIGS. 10A to 10E; in the second display mode, one unit display area shows the information for identifying a card group and the information for identifying the number of cards constituting the card group. FIGS. 10A to 10E are schematic diagrams illustrating a transition of displays in areas 103 and 102 on a game screen of the terminal device shown when the server device performs a fusion (enhancing) function according to Embodiment 3 of the present invention. In the following description, the maximum number of cards selectable as cards for fusion (feeder cards) is nine for example.

Figure 10A:
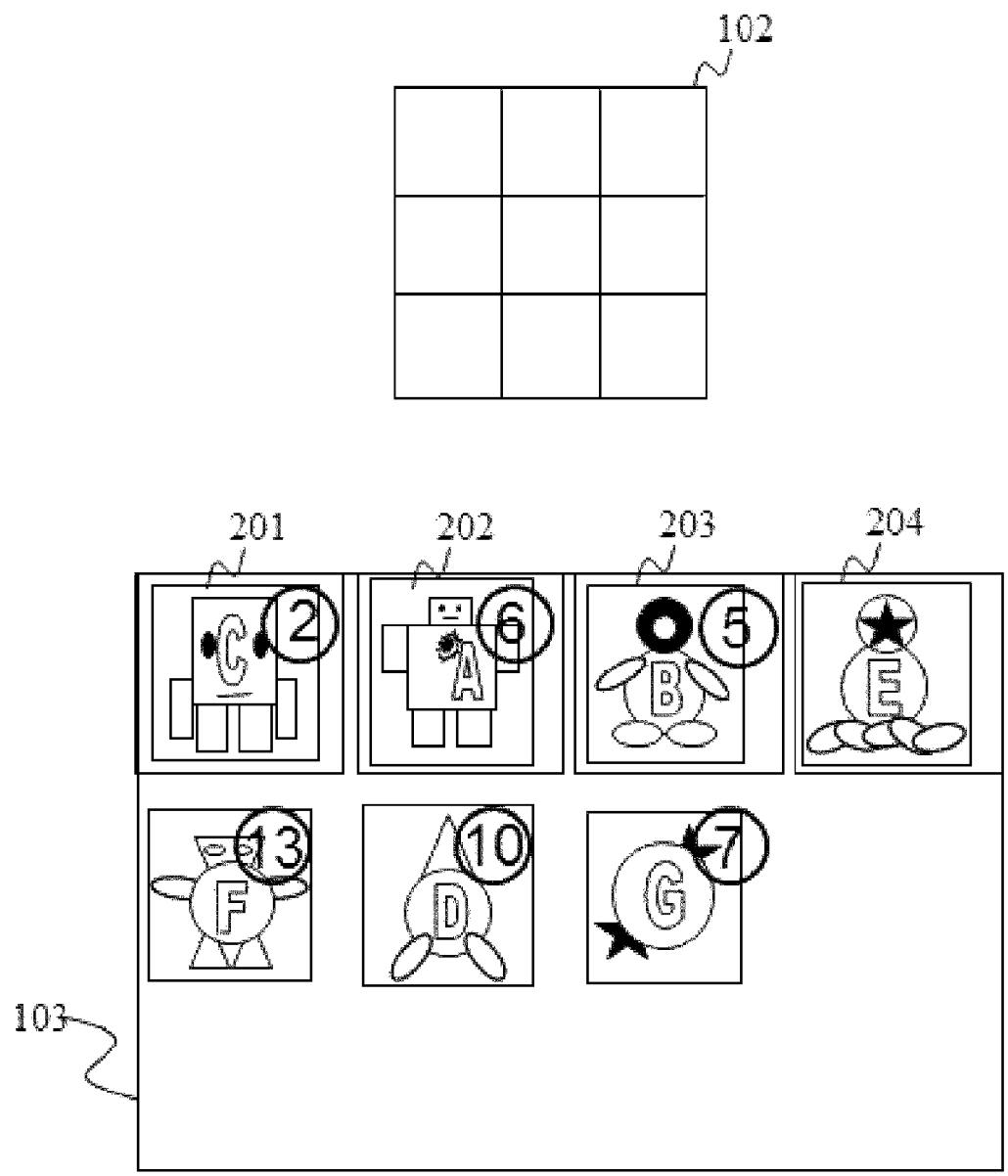
FIG. 10A is a schematic diagram illustrating a transition of displays in areas 103 and 102 on a game screen of a terminal device shown when the server device performs a fusion (enhancing) function according to Embodiment 3 of the present invention.

As shown in FIG. 10A, the area 102 contains nine areas for placing cards for fusion (feeder cards). Each of these nine areas is referred to as "a placement area" for convenience. The number of vacant placement areas in the area 102 is X (from 0 to 9), and the number of specific cards constituting one card group selected by the player in the area 103 is Y.

The following rules are applicable. (Rule 1) When Y≤X, the area 102 shows all of the Y specific cards as cards for fusion (feeder cards). The entirety of the selected card group disappears from the area 103. (Rule 2) When Y>X, the area 102 shows only X specific cards among the Y specific cards as cards for fusion (feeder cards). In the area 103, the number of the specific cards constituting the selected card group is displayed as (Y−X). (Rule 3) When the player clicks or taps a card for fusion (feeder card) which is displayed in a placement area in the area 102, the card for fusion (feeder card) disappears from the area 102 and returns into the area 103.

For a specific example, FIG. 10A shows that X=9.

Figure 10B:
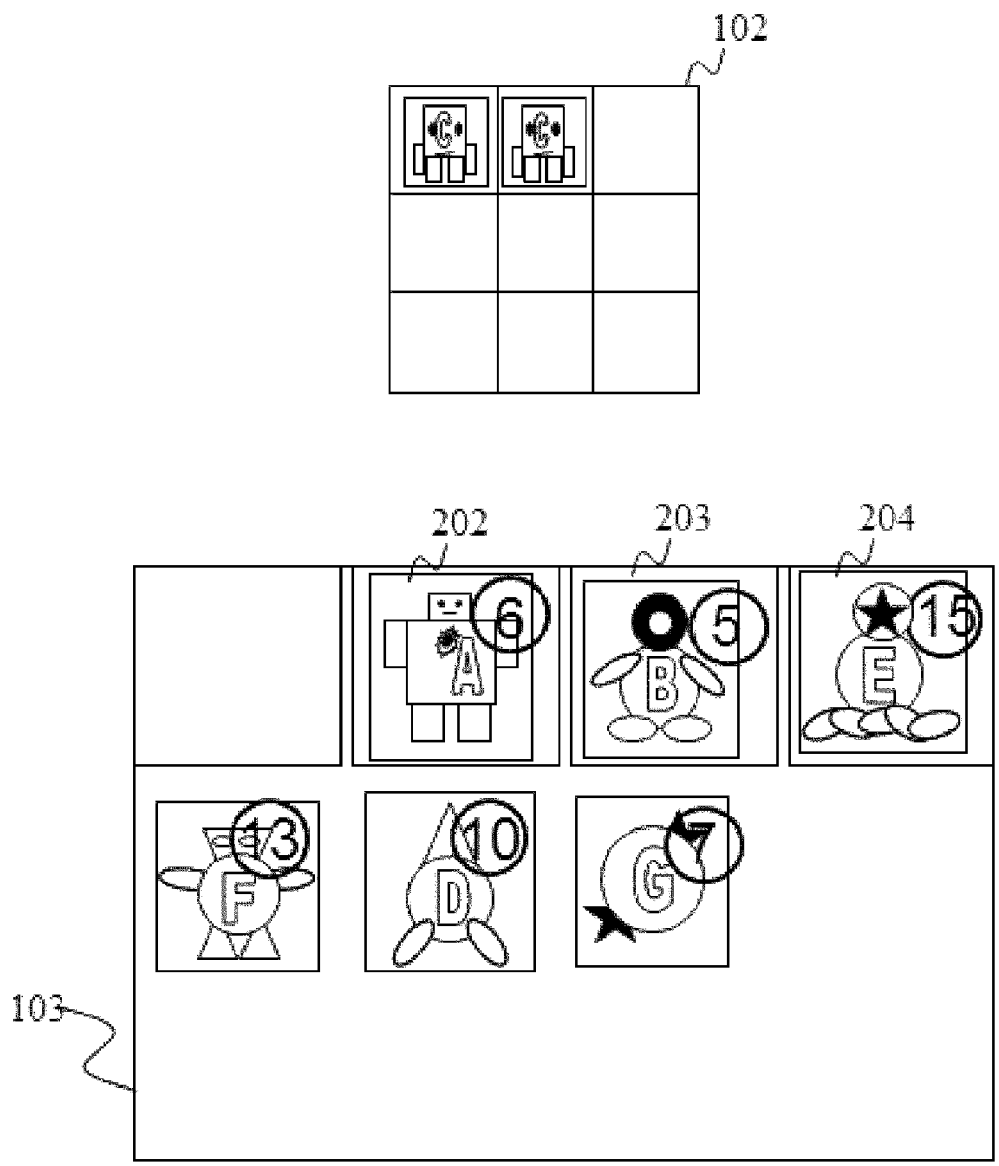
FIG. 10B is a schematic diagram illustrating a transition of displays in areas 103 and 102 on a game screen of the terminal device shown when the server device performs a fusion (enhancing) function according to Embodiment 3 of the present invention.

In Step 1, the player selects a card group 201 (Y=2); because the relation Y≤X is satisfied, Rule 1 is applied. Accordingly, as shown in FIG. 10B, the area 102 shows all of the two specific cards. The entirety of the card group 201 disappears from the area 103. In this state, X=7.

Figure 10C:
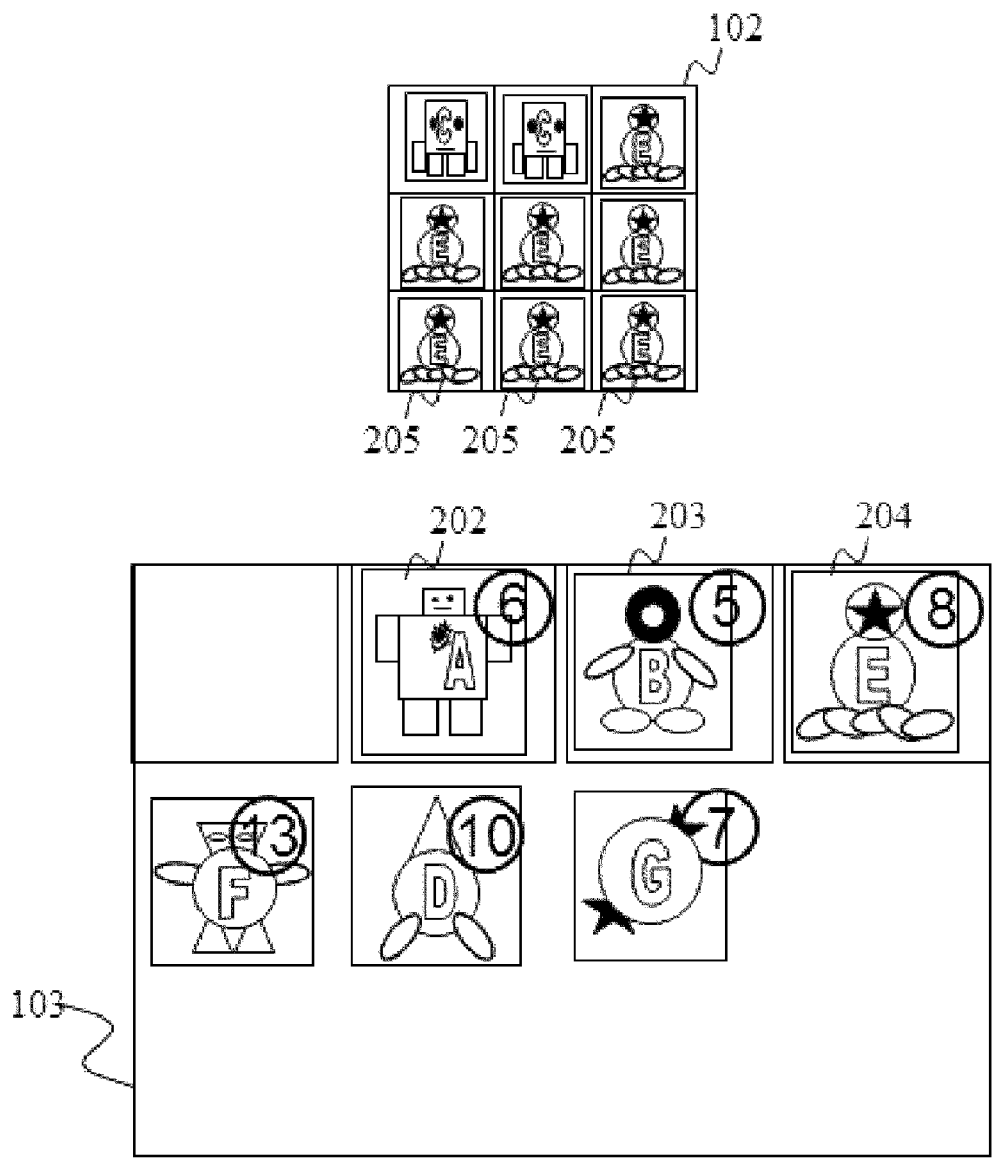
FIG. 10C is a schematic diagram illustrating a transition of displays in areas 103 and 102 on a game screen of the terminal device shown when the server device performs a fusion (enhancing) function according to Embodiment 3 of the present invention.

In Step 2, the player selects a card group 204 (Y=15); because the relation Y>X is satisfied, Rule 2 is applied. Accordingly, as shown in FIG. 10C, the area 102 shows only seven specific cards among the 15 specific cards as cards for fusion (feeder cards). In the area 103, the number of the specific cards constituting the card group 204 is displayed as (15−7=8). In this state, X=0.

Figure 10D:
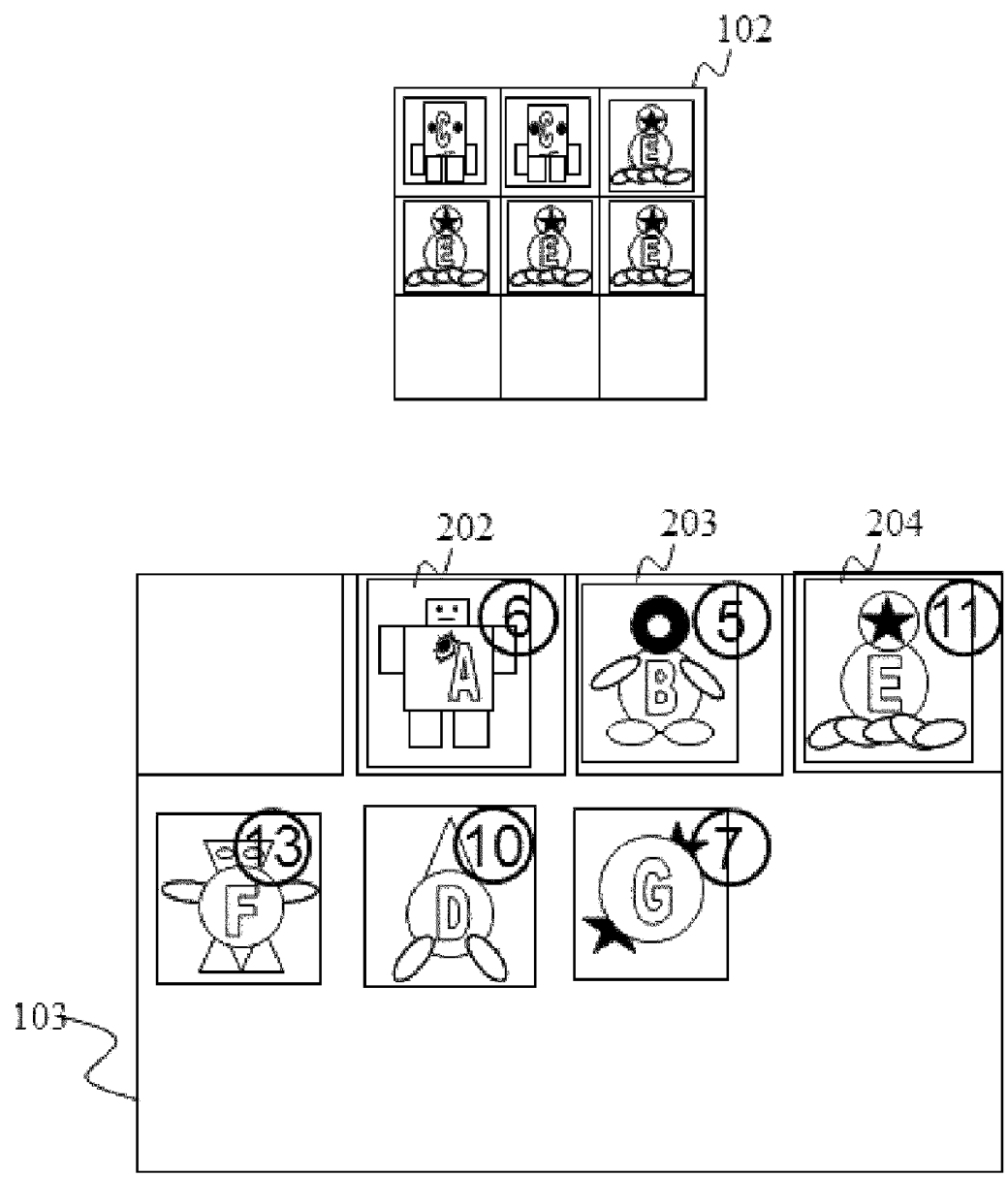
FIG. 10D is a schematic diagram illustrating a transition of displays in areas 103 and 102 on a game screen of the terminal device shown when the server device performs a fusion (enhancing) function according to Embodiment 3 of the present invention.

In Step 3, the player determines that the number of the cards for fusion (feeder cards) which are placed in the placement areas in the area 102 in Step 2 is larger than intended by the player, and clicks or taps the three cards for fusion (feeder cards) 205 shown in the placement areas in the area 102. In this case, Rule 3 is applied; as shown in FIG. 10D, these three cards for fusion (feeder cards) 205 disappears from the area 102. Further, these three cards for fusion (feeder cards) 205 return into the area 103, and the number of the specific cards constituting the card group 204 in the area 103 is displayed as 11. In this state, X=3. Additionally, the operations in Step 2 and Step 3 can be regarded as a series of operations required for placing four cards for fusion (feeder cards) 205 into the area 102.

In Step 4, the player selects a card group 202 (Y=6); because the relation Y>X is satisfied, Rule 2 is applied. Thus, the contents of the area 102 and the area 103 are as shown in FIG. 10E.

Figure 10E:
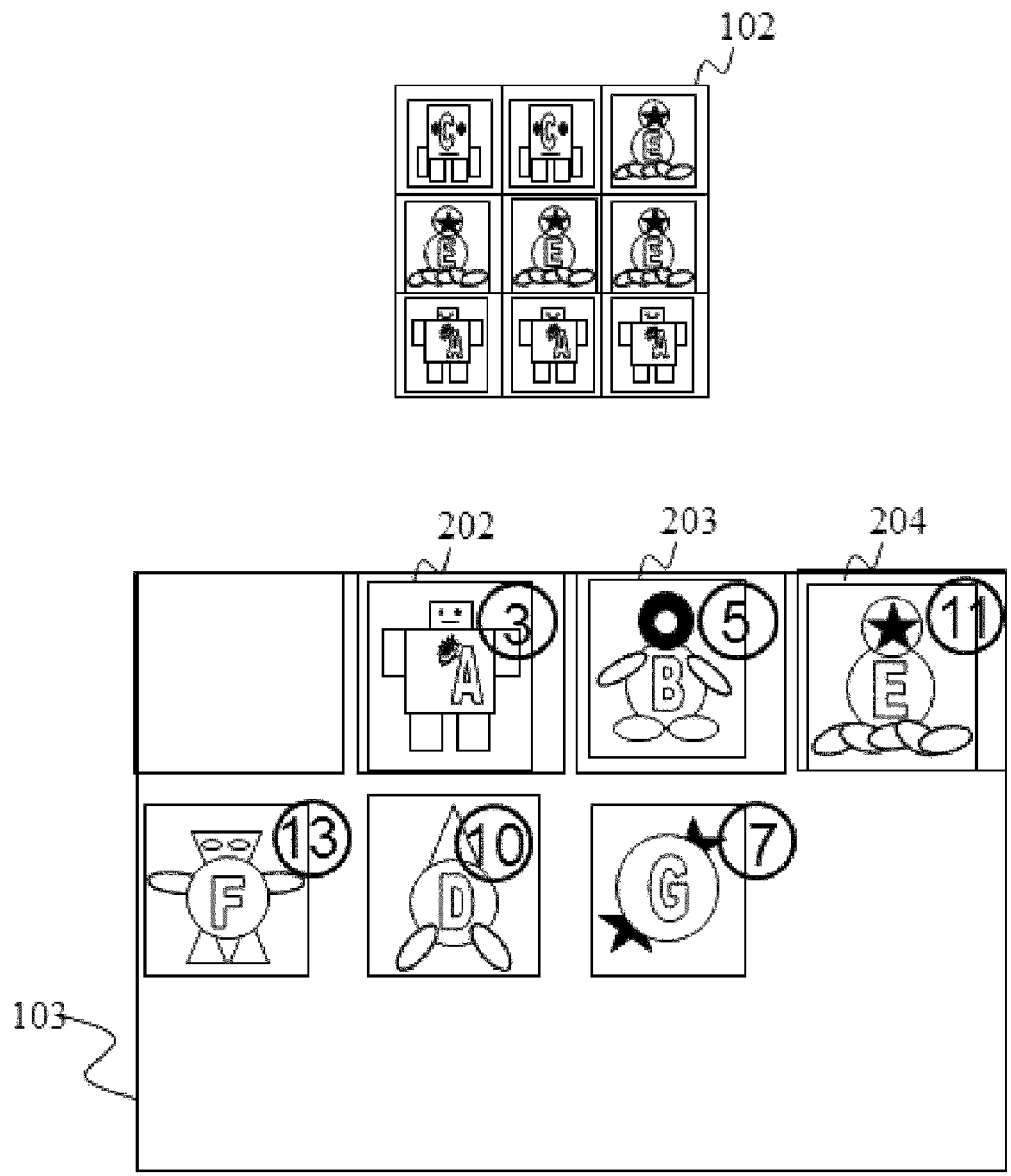
FIG. 10E is a schematic diagram illustrating a transition of displays in areas 103 and 102 on a game screen of the terminal device shown when the server device performs a fusion (enhancing) function according to Embodiment 3 of the present invention.

Finally, the player performs the confirmation operation, and the base card placed in the area 101 of FIG. 9 is fused with the cards for fusion (feeder cards) which are placed in the area 102 of the FIG. 10E. The player can perform the confirmation operation in any of the states of FIGS. 10B to 10D, in addition to FIG. 10E.

As described above, the player can readily place desired cards into the area 102 (a specific display area) for displaying cards for fusion (feeder cards), even in the second display mode wherein one unit display area shows the information for identifying a card group and the information for identifying the number of cards constituting the card group.

For the above embodiments, a card game performed as an online game is described as a specific example. However, in another embodiment, a terminal device 30 may not communicate with a server device 10 while performing a card game by executing a game program previously downloaded from the server device 10 and stored on an external memory 35. In still another embodiment, a terminal device 30 not having a component to communicate with a server device 10 may perform a card game by executing a game program previously obtained from a CD-ROM, DVD-ROM, or USB memory and stored on an external memory 35. In any of these embodiments, the terminal devices 30 are essentially provided with functions equivalent to those of the server device 10 shown in FIG. 3 (these functions are implemented by the components of the terminal device 30 shown in FIG. 2).

The processes and procedures described and illustrated herein are implemented by software, hardware, or any combination thereof, as well as that explicitly stated in the embodiments. More specifically, the processes and procedures described and illustrated herein are implemented by the installation of the logic corresponding to the processes into a medium such as an integrated circuit, a volatile memory, a non-volatile memory, a magnetic disk, or an optical storage. The processes and procedures described and illustrated herein may also be installed in the form of a computer program, and executed by various computers.

If the processes and procedures has been described and illustrated herein to be executed by a single device, software, component, or module, such processes or procedures may also be executed by a plurality of devices, a plurality of pieces of software, a plurality of components, and/or a plurality of modules. The data, table, or database described and illustrated herein to be stored in a single memory may also be distributed to and stored in a plurality of memories included in a single device or a plurality of memories which are located in a plurality of devices in a distributed manner. Furthermore, the software and hardware elements described and illustrated herein may also be integrated into a smaller number of constituent elements or separated into a larger number of constituent elements.

What is claimed is:

1. A server device for providing a game to a terminal device operated by a player and connected to the server device via a communication network, the server device comprising:
an information storage unit configured to store information on at least a plurality of game media;

a first identification unit configured to read the information on the plurality of game media from the information storage unit and identify, among the plurality of game media, a plurality of specific game media satisfying a specific criterion as one game medium group;

a second identification unit configured to identify a number of the plurality of specific game media constituting the one game medium group; and a control unit configured to generate and display on a display unit of the terminal device a display image including first information identifying the one game medium group and second information identifying the number of the plurality of specific game media, wherein the control unit transitions from a first display mode, where each of the plurality of game media is arranged in one unit display area in the display image, to a second display mode, where the first information and the second information are arranged in one unit display area in the display image.

2. The server device of claim 1 wherein, in the display image, the second information is represented by a character or by a pattern including the plurality of game media overlaid one over another.

3. The server device of claim 2 wherein, in the second display mode, the control unit receives, from the terminal device, information on one game medium group selected by the player for processing via an input unit of the terminal device from the plurality of game medium groups included in the display image displayed on the display unit of the terminal device, and arranges the plurality of specific game media constituting the one game medium group in a specific display area in the display image.

4. The server device of claim 1 wherein the specific criterion requires the game media to have same content for a specific parameter.

5. The server device of claim 3 wherein the selected one game medium group undergoes game medium fusion.

6. A game system having a terminal device operated by a player and a server device connected to the terminal device via a communication network, for providing a game to the terminal device, the game system comprising:

an information storage unit configured to store information on at least a plurality of game media;

a first identification unit configured to read the information on the plurality of game media from the information storage unit and identify, among the plurality of game media, a plurality of specific game media satisfying a specific criterion as one game medium group;

a second identification unit configured to identify a number of the plurality of specific game media constituting the one game medium group; and a control unit configured to generate and display on a display unit of the terminal device a display image including first information identifying the one game medium group and second information identifying the number of the plurality of specific game media, wherein the control unit transitions from a first display mode, where each of the plurality of game media is arranged in one unit display area in the display image, to a second display mode, where the first information and the second information are arranged in one unit display area in the display image.

7. A method using a computer connected to a terminal device operated by a player via a communication network and capable of accessing an information storage unit configured to store information on at least a plurality of game media, the method comprising the steps of:

reading the information on the plurality of game media from the information storage unit and identifying, among the plurality of game media, a plurality of specific game media satisfying a specific criterion as one game medium group;

identifying a number of the plurality of specific game media constituting the one game medium group;

generating and displaying on a display unit of the terminal device a display image including first information identifying the one game medium group and second information identifying the number of the plurality of specific game media; and transitioning from a first display mode, where each of the plurality of game media is arranged in one unit display area in the display image, to a second display mode, where the first information and the second information are arranged in one unit display area in the display image.

* * * * *

UNITED STATES PATENT AND TRADEMARK OFFICE
CERTIFICATE OF CORRECTION

| | | |
|---|---|---|
| PATENT NO. | : 8,591,303 B2 | Page 1 of 1 |
| APPLICATION NO. | : 13/775007 | |
| DATED | : November 26, 2013 | |
| INVENTOR(S) | : Ryuji Ikeda | |

It is certified that error appears in the above-identified patent and that said Letters Patent is hereby corrected as shown below:

On the title page, in Item (30) Foreign Application Priority Data, change "Feb. 28, 2012   (JP) ......................... 20102-041908"

to --Feb. 28, 2012      (JP) ........................ 2012-041908--.

Signed and Sealed this
Twenty-first Day of October, 2014

Michelle K. Lee
*Deputy Director of the United States Patent and Trademark Office*